United States Patent

Thomas et al.

[15] 3,687,923
[45] Aug. 29, 1972

[54] POLYMERIZATION OF ETHYLENIC MONOMERS AND PRODUCTS THEREOF

[72] Inventors: Jean Claude Thomas, Lyon, Rhone; Salomon Soussan, Saint-Fons, Rhone, both of France

[73] Assignee: Produits Chimiques Pechiney-Saint-Gobain, Paris, France

[22] Filed: March 17, 1966

[21] Appl. No.: 535,037

[30] Foreign Application Priority Data

March 17, 1965 France.......................659562

[52] U.S. Cl. ........260/92.8 R, 260/86.3, 260/87.5 R, 260/87.7
[51] Int. Cl...........C08f 3/30, C08f 1/04, C08f 15/30
[58] Field of Search......................260/92.8

[56] References Cited

UNITED STATES PATENTS

| | | |
|---|---|---|
| 2,961,432 | 11/1960 | Fikentscher et al. ......260/92.8 |
| 3,102,087 | 8/1963 | Jobard et al..............260/92.8 |
| 3,480,606 | 11/1969 | Thomas....................260/92.8 |

FOREIGN PATENTS OR APPLICATIONS 1,357,736   4/1964   France......................260/92.8

*Primary Examiner*—Joseph L. Schofer
*Assistant Examiner*—John A. Donahue, Jr.
*Attorney*—John L. Seymour and Arthur W. Dew

[57] ABSTRACT

An improved process for the production of fine spherical grains of substantially uniform size of an ethylenic polymer and in particular vinyl chloride, which comprises polymerizing a portion of the monomer with turbulent agitation to form seeds, and adding a larger portion of liquid monomer and continuing the polymerization with mild agitation.

9 Claims, No Drawings

POLYMERIZATION OF ETHYLENIC MONOMERS AND PRODUCTS THEREOF

This invention relates in particular to the preparation of polyvinyl chloride in mass, that is to say in the absence of solvents and diluents, and in general to the polymerization in mass of ethylenic monomers the polymers of which are insoluble in their monomers. The term polymerization includes both homopolymerization and copolymerization.

It has been proposed in U.S. application Ser. No. 345,944, now abandoned, to polymerize such monomers to about 7 to 15 percent of completion in an initial stage of turbulent agitation and to complete the polymerization to a selected end point, for instance around 70–75 percent, with mild agitation. In the first stage the agitation is as turbulent as the nature of the apparatus permits and in the second stage it is as mild as will maintain uniform conditions of temperature. The polymerization was carried out under conditions of temperature, pressure and catalysis favorable to the polymerization reaction. The temperatures employed, the corresponding pressures, and the catalysts used were typical of the prior art, as they are in the present invention.

It would be ideal to produce polyvinyl chloride grains all of one size and shape, for instance spheres 300 microns in diameter, but the prior art produced neither such sizes nor such shapes; the sizes were heterogeneous, from minute particles passing readily through a 100 micron screen to large aggregates greater than 630 microns in size. The shapes were flaky and irregular in every dimension. It was an object of the identified case, as it is an object of this one, to produce such polymers in regular spherical grains with an approach to uniformity of size. A breakthrough was obtained in U.S. application Ser. No. 97,982, now abandoned, wherein polyvinyl chloride was produced in spherical grains with a rough approximation of equal size. The case first identified exhibited a massive improvement in granulometry; the spherical grains constituted a larger percentage of the total production and variation in size was much reduced.

It is an object of the present invention to still further improve the granulometry (size and shape) of ethylenic polymers by production in mass. It is also a particular object of this invention to improve the efficiency of the new process which is represented by these cases. Another object is to produce spherical grains of excellent granulometry by a new method.

The objects of the invention are accomplished generally speaking by a method of polymerizing polyvinyl chloride in mass which comprises submitting a part of the monomer to polymerization until a small part of it is polymerized, then adding new monomer to the same apparatus and subjecting the mixture to mild agitation under conditions of temperature, pressure and catalysis favorable to polymerization. In particular, the process involves a method of polymerizing ethylenic monomers in mass, the polymers of which are insoluble in the monomers, which comprises polymerizing a quantity of the monomer under conditions of temperature, pressure, and catalysis favorable to polymerization with turbulent agitation until about 7 to about 15 percent of the said quantity are polymerized, mixing the newly formed polymer with additional monomer, and continuing the process to a selected end point under conditions of temperature, pressure, and catalysis favorable to polymerization but with mild agitation.

It will assist in comprehending the difference between the product of these cases and the product of the prior art to regard the product of the prior art as produced by random polymerization in random directions whereas the new product is produced by regular growth in all directions.

As the production of polyvinyl chloride is particularly valuable, this description will be directed mainly to its formation by the novel process and it is to be understood that this is a representative disclosure and that the process can be applied to other ethylenic monomers in which their polymers are insoluble. Examples include the comonomers hereinafter listed, vinyl compounds such as styrene and vinylidene chloride and acrylic monomers.

According to the present invention the polymerization includes two stages, in the first of which the monomer, for instance vinyl chloride, is received in an autoclave under satisfactory conditions of temperature, pressure and catalysis and undergoes polymerization to 7 to 15 percent and preferably 8 to 10 percent, with turbulent agitation, the agitation in this stage being generally the more satisfactory as it is the higher. When this stage of polymerization has been reached and the solid polyvinyl chloride in minute particles is suspended in the liquid monomer, an additional quantity of monomer is added and the polymerization is continued with mild agitation. In this second stage the agitation is as mild as will produce a good temperature control of the entire reaction mass.

In the cases identified hereinabove there are described apparatus capable of use in the present invention. As such apparatus is not novel to this case it is not described herein.

The catalysts employed are those which are normally used with the particular polymer involved. Lists are available in publications dealing with the subject.

In the good practice of the present invention the quantity of monomer used in the first stage should be at least one-third by weight of the total quantity of monomer which is to undergo the reaction. The autoclave will receive, for example, one-third to one-half of the total charge, which will undergo the polymerization with turbulent agitation and the autoclave will then receive the remainder of the monomer and the total will undergo the second stage with mild agitation.

This process appears to involve a new phenomenon, the formation of minute seeds of polymer in the first stage, and the regular expansion of these seeds, by regular growth in all directions, to the formation of spherical grains of greater regularity in the second stage. There appears to be little if any new seed formation in the second stage, the second stage being devoted largely to the expansion of the seeds of the first stage.

The lower limit of one-third is not equitorial but a boundary of good practice when the monomer is vinyl chloride. It is possible to make positive or negative modifications as the function of the general reaction conditions and of the type of monomer being polymerized. In particular, the degree of turbulence in the first stage, a measure of which is the speed of the agitator in the autoclave, has an important effect as the greater the turbulence, the higher the speed of agitation, the greater the number of minute particles formed. This, in turn, has a determinative effect on the average size of the spherical grains which are produced.

For general conditions relating to polymerization which are applicable to the present case F.P. No. 1,357,736 may be consulted.

The following examples illustrate the invention.

EXAMPLE I

This example illustrates the process of one of the identified cases.

A stainless steel autoclave of 500 liters capacity equipped with paddle wheels was purged, and received 200 kgs. of vinyl chloride and 32 g. (0.016 percent) of azodiisobutyronitrile catalyst. The agitators were rotated at 100 rpm., the temperature was raised to and maintained at 62° C. for 3 hours at a relative pressure of 9.3 bars. Thereafter the speed of the agitator was reduced to 30 rpm. for 13 hours. The residual monomer was released and 68 percent by weight of the monomer was recovered as a powder of apparent density 0.56 which had the following granulometry:

TABLE 1

| Screen ($\mu$) | 630 | 500 | 400 | 315 | 250 | 200 | 160 | 100 |
|---|---|---|---|---|---|---|---|---|
| % Fallthrough | 97 | 95 | 94 | 93 | 87 | 73 | 65 | 0 |

Three percent were larger than 630 microns in size, 13 percent were larger than 250 microns in size and 27 percent were larger than 200 microns in size. Seventy-three percent were between 100 and 200 microns in size.

EXAMPLE II

This example is carried out according to the new process. The autoclave of Example I was purged and received 100 kg. of the monomer and 16 g. of the same catalyst. The agitator was rotated at 100 rpm. and the temperature was 62°C. After three hours 100 kg. of vinyl chloride monomer were added with 16 g. of the same catalyst. The speed of the agitator was reduced to 30 rpm. for 13 hours. The residual monomer was released and the yield was 69.5 percent of a powder having an apparent density of 0.57 and a K index of 52. The granulometry of the product was as follows:

TABLE 2

| Screen ($\mu$) | 630 | 500 | 400 | 315 | 250 | 200 | 160 | 100 |
|---|---|---|---|---|---|---|---|---|
| % Fallthrough | 99 | 99 | 98 | 97 | 92 | 89 | 75 | 1 |

89 percent of these particles were less than 200 microns in size and 74 percent were between 100 and 160 microns. Only 1 percent were larger than 630 microns. This represents an improvement over the product of Example I.

In both cases the product was composed of spherical grains.

EXAMPLE III

The apparatus was the same as that of Example I. It received 70 kg. of vinyl chloride and 0.016 percent of the same catalyst. The agitator was run at 100 rpm. during the first stage of 3 hours and the temperature and pressure was 62° C. and 9.3 bars. After this stage 140 kg. of vinyl chloride were added with 22.4 g. of the same catalyst and the speed of agitation was reduced to 30 rpm. This stage continued 13 hours 30 minutes for a total polymerization time of 16 hours 30 minutes. The yield was 67.3 percent of a spherically granular powder of apparent density 0.54 and K index of 62. The granulometry is shown in Table 3.

TABLE 3

| Screen ($\mu$) | 630 | 500 | 400 | 315 | 250 | 200 | 160 | 100 |
|---|---|---|---|---|---|---|---|---|
| % Fallthrough | 99 | 98 | 97 | 94 | 90 | 80 | 30 | 2 |

If the results of Examples I, II and III are compared, it will be observed that the apparent density of Example III is slightly below that of Examples I and II and that grain sizes are somewhat rearranged, a slightly larger proportion being found in the medium sizes.

EXAMPLE IV

In this example apparatus of large commercial size was used, and the catalytic principle described in a copending case was employed. Two catalysts were used, one of rapid decomposition in the first stage of the process, and one of slow decomposition in the second stage. In the first stage one half the total monomer was polymerized to 7 to 15 percent of completion. The autoclave employed was of water jacketed, horizontal, fixed, cylindrical type equipped with two full length, paddle type agitators oppositely disposed on a central rotary shaft. It was equipped with a valved inlet and outlet, and a valved vent for gases.

The apparatus was purged of air by evaporating 300 kg. of liquid monomer within it, 3000 kg. of the monomer and 166.5 g. (0.0004 percent of active oxygen) of acetylcyclohexanesulfonyl peroxide catalyst were injected. This catalyst acts rapidly. The agitator rotated at 40 rpm. and the reaction mass rapidly attained a temperature of 62° C. and a pressure of 9.3 bars at which it was stabilized by heat exchange. After 1 hour and a quarter the conversion to polymer had attained 10 percent and the reaction had become latent. Into this reaction mass of monomer and suspended polymer were injected 3,000 kg. of monomer with 1,200 g. of azodi-isobutyronitrile catalyst, which has a slow rate of decomposition. The speed of the agitator was reduced to 5 rpm., polymerization resumed at 62° C. and 9.3 bars and continued for 10 hours, 15 minutes for a total time of 11 hours, 30 minutes. At the end of the second stage the reaction had again become latent.

The autoclave was voided to recover the residual monomer, and a polymer yield of 68.2 percent of the monomer was recovered. It was a powder of spherical grains of K value 62 and apparent density 0.56. The granulometry of the product is shown in Table 4.

TABLE 4

| Screen ($\mu$) | 630 | 500 | 400 | 315 | 250 | 200 | 160 | 100 |
|---|---|---|---|---|---|---|---|---|
| % Fallthrough | 99 | 99 | 98 | 96 | 94 | 90 | 78 | 1 |

Comparing this with the other examples, there was a material saving of time which makes for greater efficiency in production and in the use and cost of apparatus. The concentration of particle sizes is equally good, 90 percent being less than 200 microns and 77 percent between 100 and 160.

EXAMPLE V

The autoclave was of 500 l capacity, equipped with a plurality of short paddles, offset from each other. 95 kg. of vinyl chloride, 5 kg. of vinyl acetate, and 5.55 g. of acetylcyclohexanesulfonyl peroxide (0.0004 percent of active oxygen), a rapid catalyst, were added. The temperature used was 62° C. and the speed of the agitator 100 rpm.

After 1 hour, 15 minutes the latent state was reached and an equal quantity of the monomers was injected into the autoclave with 40 g. of azodiisobutyronitrile, a slow catalyst. The agitator was reduced to 30 rpm. and polymerization resumed and was continued for 10 hours, 30 minutes, for a total of 11 hours, 45 minutes. The autoclave was vented to recovery and discharged with a yield of 74.2 percent of spherical granules of apparent density 0.67, K value of 56, and the granulometry of Table 5.

TABLE 5

| Screen ($\mu$) | 630 | 500 | 400 | 315 | 250 | 200 | 160 | 100 |
|---|---|---|---|---|---|---|---|---|
| % Fallthrough | 99 | 98 | 97 | 95 | 91 | 82 | 60 | 2 |

89 percent of the particles were between 100 and 250 mu, and 80 percent between 100 and 200 mu.

EXAMPLE VI

A vertical, cylindrical autoclave was used which was equipped with the usual filling, control, and discharge devices and with two agitators, a high speed turbine bicone operating centrally and a slow speed, anchor type operating peripherally of the reaction mass. One third of the monomer was admitted in the first stage 35 kg. of vinyl chloride and 1.942 g. (0.0004 percent of active oxygen) of acetylcyclohexanesulfonyl peroxide, a rapid catalyst. Both agitators were started, the bicone at 720 rpm. (in other tests it ran at upward of 1400) and the anchor at 25 rpm. The temperature was 62° C. After 1 hour the conversion was 8 percent and a latent state was reached. The bicone was stopped, 70 kg. of vinyl chloride were injected with 26.25 g. of azodiisobutyronitrile, a slow catalyst. The second stage began and was continued for 10 hours, 30 minutes at 62° C. with the anchor agitator still in operation. The apparatus was vented to recover monomer and a 76.4 percent yield of spherical grains having apparent density 0.50 and K index 62 was obtained. The granulometry is in Table 6.

TABLE 6

| Screen ($\mu$) | 630 | 500 | 400 | 315 | 250 | 200 | 160 | 100 |
|---|---|---|---|---|---|---|---|---|
| % Fallthrough | 98 | 98 | 97 | 94 | 85 | 60 | 30 | 4 |

The apparent density was less than in some other cases, the granulometry more dispersed in sizes, and this was attributed to the low speed of the bicone, which did not achieve as high a seed formation as could be produced. When the same procedure was repeated at 1,440 rpm. for the bicone there was a more abundant formation of polymer seeds and the result shown in Table 6a.

TABLE 6a

| Screen ($\mu$) | 630 | 500 | 400 | 315 | 250 | 200 | 160 | 100 |
|---|---|---|---|---|---|---|---|---|
| % Fallthrough | 99 | 99 | 98 | 96 | 94 | 90 | 80 | 1 |

The apparent density was also 0.50 but the granulometry was concentrated in fewer sizes, 90 percent of the spherical particles being less than 200 microns and 79 percent between 100 and 160 microns. This demonstrates a fact that the process is better carried out at very high speeds in the first stage.

EXAMPLE VII

The autoclave was as in Example VI. The first charge was 47.5 kg. of vinyl chloride, 2.5 kg. of vinyl acetate and 2.775 g. of acetylcyclohexanesulfonyl peroxide, a rapid catalyst. Both agitators were used in the first stage, the turbine at 200 rpm. and the anchor at 25. The temperature was 62° C. After 1 hour the first stage ended with 8 percent of polymer suspended in the monomer and the turbine was stopped. 47.5 kg. of vinyl chloride, 2.5 kg. of vinyl acetate, and 20 g. of azodiisobutyronitrile, a slow catalyst were injected. The polymerization began again at 62° C. After 10 hours, 15 minutes of mild agitation by the anchor there was a yield of 72.3 percent of fine spherical granules of apparent density 0.62 and K value of 56. The granulometry is shown in Table 7.

TABLE 7

| Screen ($\mu$) | 630 | 500 | 400 | 315 | 250 | 200 | 160 | 100 |
|---|---|---|---|---|---|---|---|---|
| % Fallthrough | 99 | 98 | 97 | 95 | 90 | 80 | 50 | 2 |

80 percent of the particles are less than 200 mu in size and 48 percent are between 100 and 160 mu.

The advantages of the invention have largely been set forth in the foregoing description but the following are also to be considered. The process produces minute spherical seeds and these seeds are spherically enlarged in admixture with fresh polymer, producing spherical granules of astonishingly uniform size, the sizes of which are concentrated within a very limited range of dimensions. The process can be made to produce particular sizes at will or, in other words, to shift the location of the preponderant sizes in a scale provided by standard screens. As the period of turbulent agitation, the first stage, is carried out on a small quantity of the monomer the power required in the total process is less and the total time is shortened. This provides better use and more efficient operation of existing equipment and reduces the number of apparatus required to attain a selected output. This is particularly marked because it enables one to use stirrers of high speed and low power of which the turbine types described in the examples are exemplary.

The specification, additionally, includes discoveries of value which contribute to the efficiency of the process in which the entire operation is carried out in a single autoclave. The basic principles of the process have also been applied to the use of a plurality of autoclaves but that process involved problems of its own which have been treated in a copending application.

As many apparently widely different embodiments of the present invention may be made without departing from the spirit and scope thereof, it is to be understood that the invention is not limited to the specific embodiments.

What is claimed is:

1. A batch method of polymerizing ethylenic monomers in mass, the polymers of which are insoluble in the monomers, which comprising polymerizing a quantity of monomer in the presence of a catalyst under conditions of temperature and pressure, favorable to polymerization, with turbulent agitation, until about 7 to 15 percent of said quantity are polymerized, adding to the newly formed polymer and untransformed monomer a quantity of additional monomer at least substantially equal to the original quantity and an additional catalyst, and continuing the process in the same apparatus to a selected end point under conditions of temperature and pressure, favorable to polymerization, but with mild agitation, to produce uniform size spherical particles of polymer.

2. A method according to claim 1 in which the monomer comprises vinyl chloride.

3. A method according to claim 1 in which the monomer includes vinyl chloride and at least one other compatible, copolymerizable, monomer.

4. A method according to claim 1 in which the first stage of polymerization is by contact with a catalyst of short half life and the second stage in contact with a catalyst of longer half life.

5. A method according to claim 2 in which the quantity of monomer employed in the stage of turbulent agitation is about one-third to one-half of the total quantity of monomer engaged in the process.

6. A method according to claim 5 which includes the step of establishing a degree of turbulent agitation as a function of the number of particles of polymer which are to be formed in the turbulent stage of the process.

7. A batch method of polymerizing ethylenic monomers, the polymers of which are insoluble in their monomers, into small spherical particles of substantially uniform size, in mass, which comprises subjecting a minor portion of the batch of such monomers with catalyst having a short half life to conditions of temperature and pressure, favorable to polymerization until 7 to 15 percent of the monomers of said minor portion have been polymerized, while maintaining the monomers in a state of turbulence, thereby forming small particles of polymer, and enlarging the particles of polymer by mixing the partly polymerized minor portion with the remaining portion of said batch of monomer and a catalyst having a longer half life than said first catalyst and continuing the polymerization uder conditions of temperature and pressure favorable to polymerization, until more than half of said batch has been polymerized, with mild agitation to form spherical dense particles.

8. A method of polymerizing vinyl chloride in mass which comprises forming minute polymer seeds from liquid monomer, by turbulent agitation in the presence of a catalyst, mixing the minute polymerseed and the liquid monomer in which they were formed with a body of liquid monomer of at least equal bulk and additional catalyst, and enlarging the seeds into fine grain spherical particles by subjecting the seeds and the mixture to mild agitation under conditions of temperature, pressure and in the presence of said catalyst favorable to polymerization.

9. The method of claim 8 in which the polymer seeds are in the mother liquor of their formation.

* * * * *